(12) United States Patent
Chen et al.

(10) Patent No.: US 11,835,208 B1
(45) Date of Patent: Dec. 5, 2023

(54) BASE ASSEMBLY AND LIGHTING DEVICE

(71) Applicant: Shenzhen Habitat Technology Co., Ltd., Shenzhen (CN)

(72) Inventors: Jing Chen, Shenzhen (CN); Yong Chen, Shenzhen (CN)

(73) Assignee: SHENZHEN HABITAT TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/130,432

(22) Filed: Apr. 4, 2023

(30) Foreign Application Priority Data

Jun. 1, 2022 (CN) .......................... 202221356593.1
Jul. 15, 2022 (CN) .......................... 202221834347.2
Jul. 15, 2022 (CN) .......................... 202221838414.8

(51) Int. Cl.
*F21V 21/22* (2006.01)
*F21V 14/02* (2006.01)
*F16M 11/24* (2006.01)
*F16M 11/28* (2006.01)

(52) U.S. Cl.
CPC ........... *F21V 21/22* (2013.01); *F16M 11/245* (2013.01); *F16M 11/28* (2013.01); *F21V 14/02* (2013.01)

(58) Field of Classification Search
CPC .... F16M 11/242; F16M 11/245; F16M 11/34; F16M 11/28; F16M 11/38; F21V 21/22; F21V 21/06; F21V 14/02; F21S 6/005; F21S 6/006; F21S 6/007; F21S 6/008
See application file for complete search history.

(56) References Cited

U.S. PATENT DOCUMENTS

| | | | | |
|---|---|---|---|---|
| 2,598,753 A * | 6/1952 | Bolsey | ................... | F16M 11/34 248/171 |
| 2,864,577 A * | 12/1958 | Du Mais | ............... | F16M 11/245 248/171 |
| 2,899,164 A * | 8/1959 | Nicholas | ............... | F16M 11/046 248/171 |
| 2,905,420 A * | 9/1959 | Petrick | ................... | G03B 21/58 248/171 |
| 5,876,011 A * | 3/1999 | Blasing | ................ | F16M 11/046 403/109.1 |
| 8,733,987 B2 * | 5/2014 | Lin | .......................... | G09F 9/33 362/396 |

(Continued)

*Primary Examiner* — Zheng Song
*Assistant Examiner* — James M Endo
(74) *Attorney, Agent, or Firm* — Bayramoglu Law Offices LLC

(57) ABSTRACT

A base assembly includes a mounting structure and a support structure. The mounting structure includes a base body, a main body, and a guide rod provided between the base body and the main body. The support structure includes a sliding element and support legs. The sliding element is slidably connected to the guide rod. Each of the support legs is provided with a rotating end and a support end that are arranged opposite to each other. The rotating end is rotatably connected to the sliding element. The sliding element is slidable toward the main body to drive a plurality of support ends to approach each other, such that the base assembly is in a folded state. One of the base body and the support leg is provided with a first locking element, and the other of the base body and the support leg is provided with a second locking element.

16 Claims, 9 Drawing Sheets

(56) References Cited

U.S. PATENT DOCUMENTS

| | | | |
|---|---|---|---|
| 2005/0117340 A1* | 6/2005 | Lee | F21L 14/00 362/249.16 |
| 2006/0086869 A1* | 4/2006 | Hsieh | F16M 11/16 248/171 |
| 2011/0122605 A1* | 5/2011 | Deighton | F16M 11/10 362/183 |
| 2014/0049953 A1* | 2/2014 | Moore | F21V 21/145 362/220 |
| 2016/0312967 A1* | 10/2016 | Harvey | F21V 21/06 |

* cited by examiner

BASE ASSEMBLY AND LIGHTING DEVICE

CROSS REFERENCE TO THE RELATED APPLICATIONS

This application is based upon and claims priority to Chinese Patent Applications No. 202221356593.1, filed on Jun. 1, 2022; No. 202221834347.2, filed on Jul. 15, 2022; and No. 202221838414.8, filed on Jul. 15, 2022, the entire contents of which are incorporated herein by reference.

TECHNICAL FIELD

The present disclosure relates to the technical field of lighting, and in particular to a base assembly and a lighting device.

BACKGROUND

As a common lighting appliance, the lighting device is provided with a plurality of support legs that are switchable between a folded state and an unfolded state. When the support legs are in the folded state, the lighting device can easily be held by the user for lighting. When the support legs are in the unfolded state, the lighting device can easily be placed on a desk, a computer table, a dining table or the ground by the user. The lighting device can also be used an outdoor lighting appliance for outdoor lighting.

SUMMARY

A first aspect of the present disclosure provides a base assembly, including:
- a mounting structure including a base body, a main body, and a guide rod provided between the base body and the main body; and
- a support structure including a sliding element and a plurality of support legs.

The sliding element is slidably connected to the guide rod. Each of the plurality of support legs is provided with a rotating end and a support end that are arranged opposite to each other. The rotating end is rotatably connected to the sliding element. The sliding element is slidable toward the main body to drive a plurality of support ends to approach each other, such that the base assembly is in a folded state.

One of the base body and the support leg is provided with a first locking element, and the other of the base body and the support leg is provided with a second locking element. When the base assembly is in the folded state, the first locking element is engaged with the second locking element.

According to the above technical solution, the embodiment of the present disclosure has at least the following beneficial effects.

In the embodiment of the present disclosure, the lighting device is provided with the second locking element located on the base body and the first locking elements located on the support legs. When the support legs are in a folded state, the second locking element is engaged with the first locking elements, such that the support legs are in a locked state. That is, the second locking element and the first locking elements form a locking fit to prevent the support legs from automatically being unfolded when being stored, thereby preventing the lighting device from being automatically unfolded. The embodiment of the present disclosure solves the problem that the support legs of a traditional lighting device are easily damaged due to looseness in the folded state.

A second aspect of the present disclosure provides a base assembly, including:
- a mounting structure including a base body, a main body, and a guide rod provided between the base body and the main body;
- a support structure including a sliding element and a plurality of support legs, where the sliding element is slidably connected to the guide rod; each of the plurality of support legs is provided with a rotating end and a support end that are arranged opposite to each other; the rotating end is rotatably connected to the sliding element; and the sliding element is slidable toward the main body to drive a plurality of support ends to approach each other, such that the base assembly is in a folded state; and
- a locking structure configured to lock the support legs in the folded state to limit rotation of the support legs, where the locking structure is further configured to unlock the support legs such that the sliding element is automatically slidable from a side where the main body is located to a side where the base body is located to unfold the support legs.

According to the above technical solution, the embodiment of the present disclosure has at least the following beneficial effects.

The locking structure of the embodiment of the present disclosure is configured to lock the support legs in the folded state to limit the rotation of the support legs. The locking structure can also unlock the support legs, such that the sliding element is automatically slidable from the side where the main body is located to the side where the base body is located to unfold the support legs. Therefore, the support legs can be automatically unfolded without manual operation after being unlocked, thereby facilitating user operation.

A third aspect of the present disclosure provides a lighting device, including:
- the base assembly, where the mounting structure is provided with a circuit board;
- a telescopic rod provided with a fixed end and a free end that are arranged opposite to each other, where the fixed end is connected to the mounting structure, and the free end is configured to extend and retract relative to the fixed end along a length extension direction of the telescopic rod; and
- a lighting assembly provided with a lighting element, where the lighting element is electrically connected to the circuit board; and the lighting assembly is rotatably connected to the free end to switch the lighting direction of the lighting element.

BRIEF DESCRIPTION OF THE DRAWINGS

To describe the technical solutions in the embodiments of the present disclosure or the prior art more clearly, the following briefly describes the accompanying drawings required for describing the embodiments or the prior art. Apparently, the accompanying drawings in the following description show some embodiments of the present disclosure, and those of ordinary skill in the art may still derive other drawings from these accompanying drawings without creative efforts.

Figure 1:
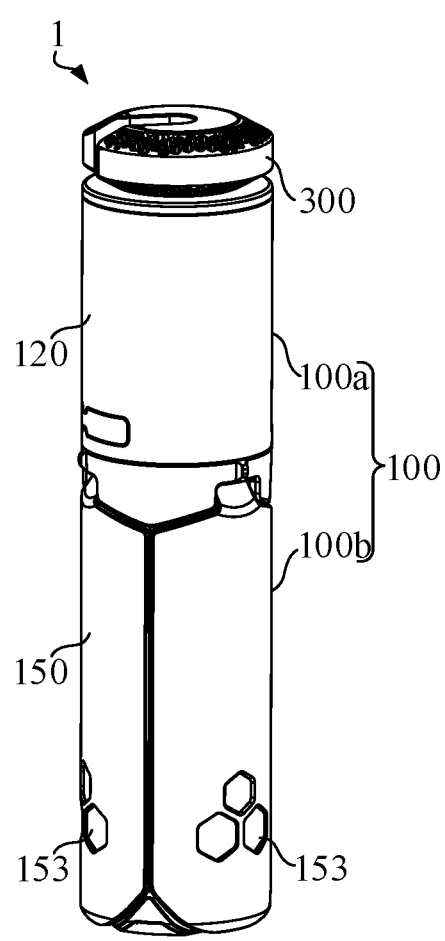
FIG. 1 is a structural diagram of a lighting device in a folded state according to an embodiment of the present disclosure.

REFERENCE NUMERALS 1. lighting device;
100. base assembly; 100a. mounting structure; 100b. support structure; 100c. battery; 100d. circuit board; 110. base body; 111. fixed base; 1111. rail groove; 112. upper cover; 113. lower cover; 114. movable space; 115. rotating groove; 120. main body; 121. sealing plug; 122. control key; 123. buffer pad; 130. guide rod; 140. sliding element; 150. support leg; 151. rotating end; 152. support end; 153. reflective sticker; 154. second fixing portion; 160. support rod; 161. first connecting end; 162. second connecting end; 1601. avoidance port; 163. first fixing portion; 170. locking structure; 171. first locking element; 172. second locking element; 173. locking portion; 174. pressing portion; 175. restoring element; and 180. tension spring;
200. telescopic rod; 210. fixed end; and 220. free end; and
300. lighting assembly; 310. heat dissipator; 311. rotating groove; 312. mounting groove; 320. lighting element; 330. transparent protective cover; 340. heat dissipator rear cover; 350. connector; 351. first connecting portion; and 352. second connecting portion.

DETAILED DESCRIPTION OF THE EMBODIMENTS

The typical implementations embodying the features and advantages of the present disclosure are described in detail below. It should be understood that the present disclosure may have various changes in different implementations, which do not depart from the scope of the present disclosure. The description and drawings herein are essentially used for the purpose of explanation, rather than to limit the present disclosure.

Moreover, the terms such as "first" and "second" are used only for the purpose of description and should not be construed as indicating or implying relative importance or implicitly indicating a quantity of indicated technical features. Therefore, the features defined by "first" and "second" can explicitly or implicitly include one or more features. In the description of the present application, "a plurality of" means two or more, unless otherwise specifically defined.

It should be noted that, unless otherwise clearly specified, in the description of the present disclosure, meanings of the terms "mount", "provide", and "connect" should be understood in a broad sense. For example, a connection may be a fixed connection, a removable connection, or an integral connection; may be a mechanical connection or an electrical connection; may be a direct connection or an indirect connection via an intermediate medium; or may be inter-communication between two components. Those of ordinary skill in the art may understand the specific meanings of the above terms in the present disclosure based on specific situations.

Figure 2:
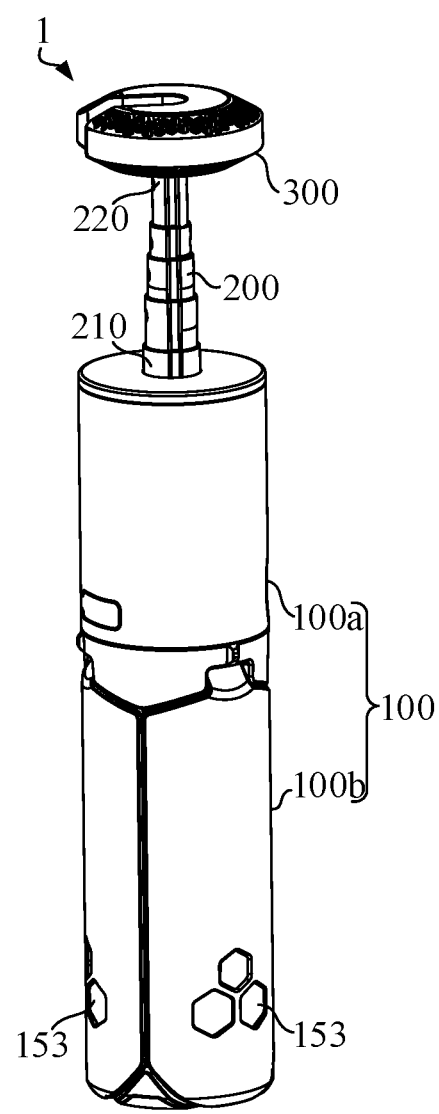
FIG. 2 is a structural diagram of a telescopic rod of the lighting device shown in FIG. 1 in an extended state.

Referring to FIGS. 1 and 2, the present disclosure provides lighting device 1. The lighting device 1 includes base assembly 100, telescopic rod 200, and lighting assembly 300. The base assembly 100 is configured to fix and support the telescopic rod 200 and the lighting assembly 300. The telescopic rod 200 is provided between the base assembly 100 and the lighting assembly 300. The telescopic rod 200 has an adjustable axial length. It can be understood that the telescopic rod 200 is extensible and retractable to change the lighting height of the lighting assembly 300 according to user needs. It should be noted that the base assembly 100 can be held by the user, and the lighting assembly 300 can be any light-emitting device. The lighting assembly 300 includes, but is not limited to a light-emitting diode (LED) light, a flashlight, a neon light, etc. Alternatively, the lighting assembly 300 may include a light-emitting panel formed by a plurality of parallel and/or series LEDs.

FIG. 1 shows that the lighting device 1 is in a folded state. In the folded state, the telescopic rod 200 is not extended, the lighting assembly 300 approaches the base assembly 100, and the overall size of the lighting device 1 is minimized. In the folded state, the lighting device 1 can be effectively folded to facilitate carrying, and the lighting device 1 can also be used as a flashlight in the folded state. When the telescopic rod 200 is extended, the lighting device 1 is switched from the folded state shown in FIG. 1 to an unfolded state shown in FIG. 2. In this state, the user can hold the base assembly 100 such that light emitted by the lighting assembly 300 can shine farther, for example, for outdoor lighting.

The telescopic rod 200 includes fixed end 210 and free end 220 that are arranged opposite to each other. The fixed end 210 is connected to the base assembly 100, and the free end 220 is connected to the lighting assembly 300. The free end 220 can be retracted relative to the fixed end 210 along a length extension direction of the telescopic rod 200 (that is, an axial direction of the telescopic rod 200) to change the distance between the lighting assembly 300 and the base assembly 100 to adapt to lighting scenes at different heights. In specific use, the user can appropriately increase the length of the telescopic rod 200 according to different lighting scenes. When the lighting device 1 is folded, the telescopic rod 200 is retracted to store the lighting assembly 300 and the base assembly 100 together. The design can reduce the occupied space of the lighting device 1 and make the lighting device easy to carry.

In order to extend and retract the telescopic rod 200, FIG. 2 shows that the telescopic rod 200 includes a plurality of rod portions connected head to tail. The inner diameters of the plurality of rod portions decrease from the fixed end 210 to the free end 220. That is, when the telescopic rod 200 is in an extended state, the inner diameters of the plurality of rod portions decrease from the base assembly 100 to the lighting assembly 300. That is, the inner diameter of the rod portion closest to the base assembly 100 is the largest, and the inner diameter of the rod portion closest to the lighting assembly 300 is the smallest. A rod portion with a smaller inner diameter can be accommodated in a rod portion with a larger inner diameter.

For easy understanding, any two adjacent rod portions are defined as a first rod portion and a second rod portion. The first rod portion approaches the lighting assembly 300, and the second rod portion approaches the base assembly 100. In order to prevent the first rod portion from separating from the second rod portion in the extension process, a first rubber pad is provided at the outer side of the tail of the first rod portion, and a second rubber pad is provided at the inner side of the head of the second rod portion. The outer diameter of the first rubber pad is larger than the inner diameter of the second rubber pad. When the tail of the first rod portion is nested inside the head of the second rod portion and the first rod portion extends away from the second rod portion, the first rubber pad is adhered to the second rubber pad to prevent the first rod portion from sliding out of the second rod portion during the extension process. It should be noted that the rubber pad can be replaced by any other soft material that can absorb vibration. Through adhesive glue or by other means, the first rubber pad is connected to the first rod portion, and the second rubber pad is connected to the second rod portion to achieve stability after the first rubber pad is connected to the first rod portion and the second rubber pad is connected to the second rod portion. The telescopic rod 200 can be made of aluminum, aluminum alloy, copper, iron, or a composite material, etc. It should be noted that in each embodiment of the present application, the head refers to an end adjacent to main body 120 and far from the base body 110, and the tail refers to the end far from the main body 120 and adjacent to base body 110.

Figure 3:
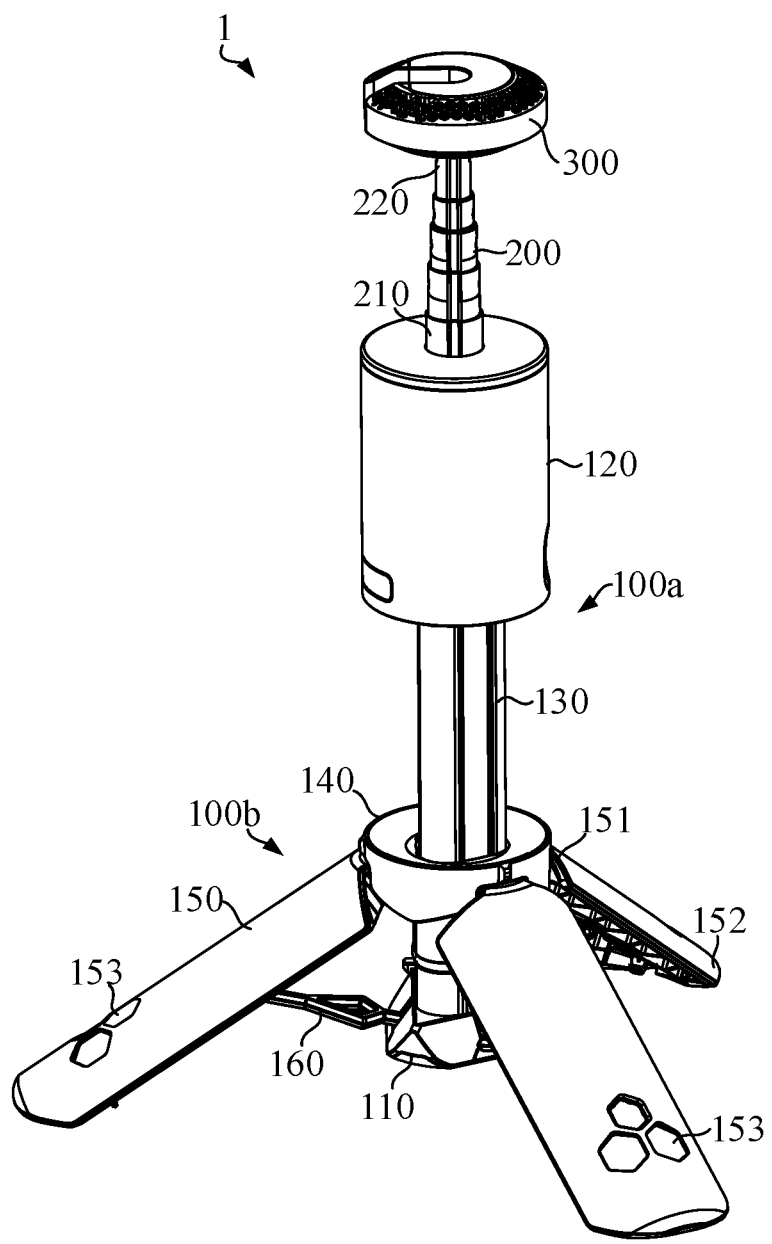
FIG. 3 is a structural diagram of a plurality of support legs of the lighting device shown in FIG. 2 in an unfolded state.
Figure 4:
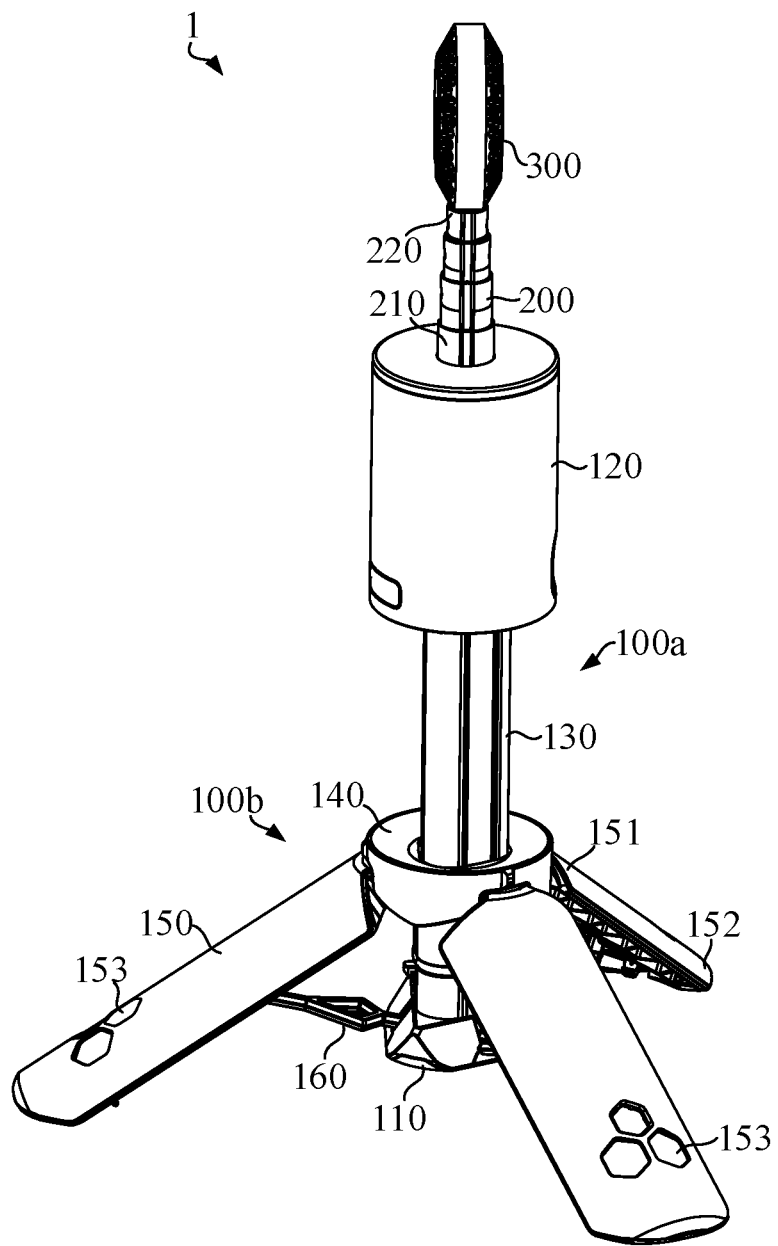
FIG. 4 is a structural diagram of a lighting assembly of the lighting device shown in FIG. 3 rotated relative to the telescopic rod.

Referring to FIGS. 3 and 4, FIGS. 3 and 4 show that the lighting assembly 300 is rotatably connected to the free end 220 and the lighting assembly 300 is rotatable relative to the free end 220, thereby switching the lighting direction of the lighting assembly 300. FIGS. 3 and 4 show that the lighting assembly 300 is rotatable axially and radially around the telescopic rod 200, that is, the lighting assembly 300 is rotatable axially and radially to adjust the height of the light assembly 300.

The lighting device 1 realizes the extension and retraction of the lighting assembly 300 through the telescopic rod 200, such that the lighting device 1 can achieve a wide height adjustment range and is convenient for the storage and carrying of the lighting device 1. Since the lighting assembly 300 is movably connected to the free end 220, the lighting assembly 300 is rotatable axially and radially around the free end 220. That is, the lighting assembly 300 can realize the angle adjustment in horizontal and vertical directions to meet different lighting angles, thereby improving the user experience.

It should be noted that when the height and lighting angle of the lighting assembly 300 are adjusted, the base assembly 100 can also be switchable from the folded state shown in FIG. 2 to the unfolded state shown in FIG. 3.

Figure 5:
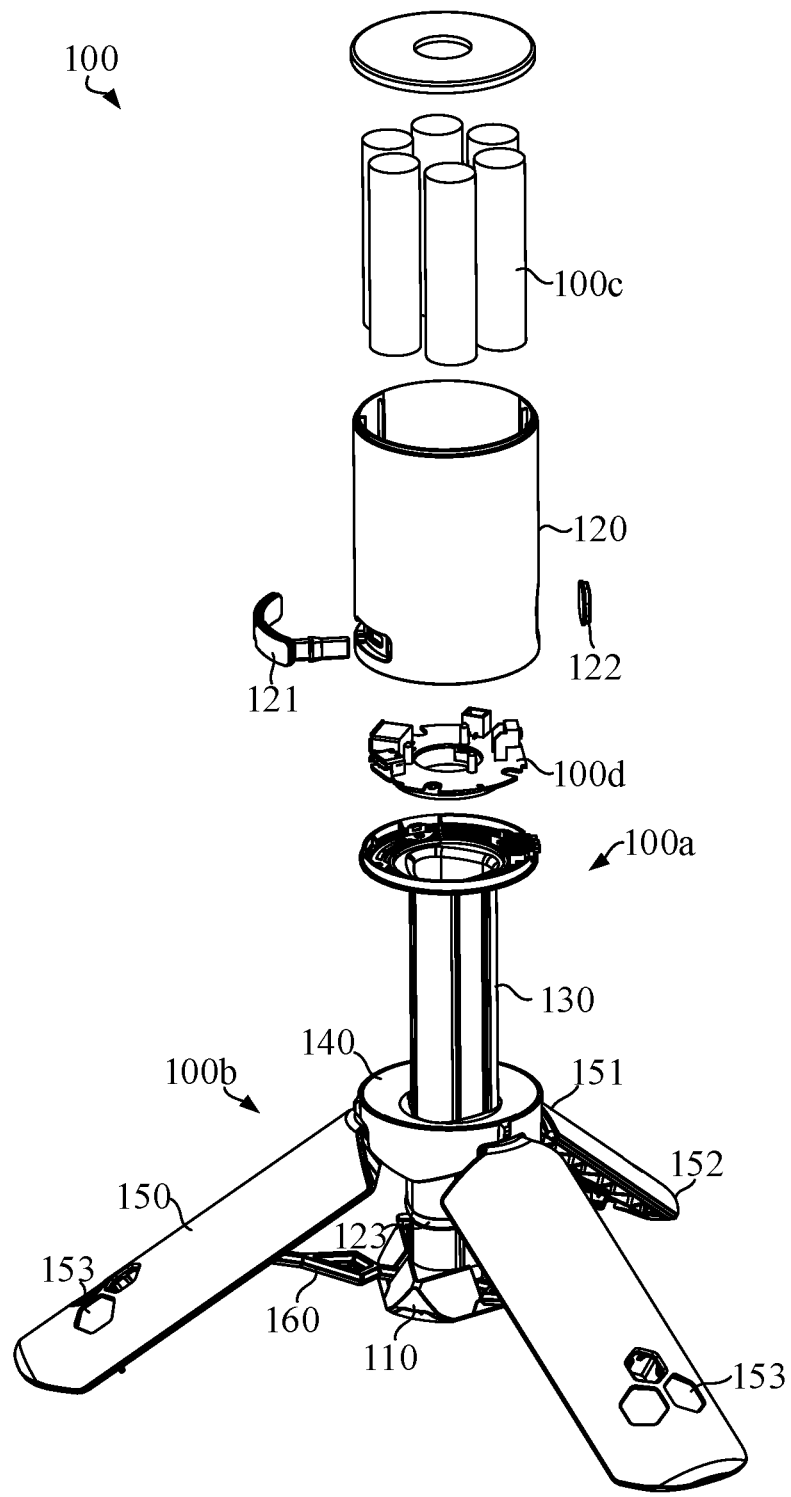
FIG. 5 is an exploded view of an upper half part of a base assembly of the lighting device shown in FIG. 3.

Referring to FIG. 5, the base assembly 100 includes mounting structure 100a and support structure 100b. The mounting structure 100a is configured to fix the telescopic rod 200. The support structure 100b is slidably provided on the mounting structure 100a and is rotatable relative to the mounting structure 100a to fold and unfold the support structure 100b.

The mounting structure 100a includes the base body 110, the main body 120, and guide rod 130 provided between the base body 110 and the main body 120. The guide rod 130, the base body 110, and the main body 120 can be combined and connected by one or more means, such as fasteners, bolts, screws, rivets, and viscous substances, or can be integrally formed, which is not limited herein. The base body 110 may be configured to be supported on a flat or uneven surface. The main body 120 may be configured to fix the fixed end 210 of the telescopic rod 200. The guide rod 130, as an intermediate connector, is configured to space the base body 110 and the main body 120. The main body 120 and the guide rod 130 may be hollow-through structures. When the main body 120 and the guide rod 130 are hollow-through structures, the fixed end 210 of the telescopic rod 200 can run through the main body 120 and the guide rod 130, and the fixed end 210 running through the main body 120 and the guide rod 130 can be extended and fixed to the base body 110. In this way, the telescopic rod 200 can be stored in an inner space of the main body 120 and an inner space of the guide rod 130. The main body 120 and the guide rod 130 may also be non-hollow-through structures. When the main body 120 and the guide rod 130 are non-hollow-through structures, the fixed end 210 is directly connected to the main body 120.

The hollow structure of the main body 120 can be provided therein with battery 100c and circuit board 100d. The battery 100c is electrically connected to the circuit board 100d. In an embodiment, the circuit board 100d is provided with a charging interface, and the main body 120 is provided with a charging through-hole that runs through an outer wall. The charging through-hole exposes the charging interface, such that an external power supply device can be connected to the charging interface through the charging through-hole to charge the battery. Of course, in this embodiment, the circuit board 100d can also be provided with a power output interface, and the main body 120 is also provided with a power output through-hole that runs through the outer wall. The power output through-hole exposes the power output interface, and the power output interface can be connected to an external electric device (such as a mobile phone or a tablet) to charge the electric device.

The main body 120 may also be provided with sealing plug 121. The sealing plug 121 is configured to seal the charging interface and the power output interface when they are idle to prevent water or ash from entering the charging interface and the power output interface to cause poor contact. In addition, the main body 120 may also be provided with control key 122. The control key 122 may be configured to control the circuit connection and disconnection of the lighting assembly 300. For example, the control key 122 can be directly configured to control the connection and disconnection of the circuit board 100d and the lighting assembly 300. It should be noted that the circuit board 100d can also be provided in the base body 110, which is not limited herein.

The support structure 100b includes sliding element 140 and support legs 150. The sliding element 140 is slidably connected to the guide rod 130. There are a plurality of support legs 150. For example, FIG. 5 shows that there are three support legs 150. It can be understood that in other embodiments, there may be two or more support legs 150. Each of the support legs 150 is provided with rotating end 151 and support end 152 that are arranged opposite to each other. The rotating end 151 is rotatably connected to the sliding element 140, and the support end 152 may be configured to be supported on a flat or uneven support surface. The support end 152 can be provided with a magnetic element to be magnetically attracted to a support surface of a metal structure. It should be noted that the sliding element 140 is slidable toward the base body 110 to drive the plurality of support ends 152 away from each other, such that the base assembly 100 is in an unfolded state. The sliding element 140 is also slidable toward the main body 120 to drive the plurality of support ends 152 to approach each other, such that the base assembly 100 is in a folded state. FIG. 1 shows that when the base assembly 100 is in the folded state, the outer surface of each of the support legs 150 is flush with the outer surface of the main body 120. In the folded state, the appearance of base assembly 100 is integral. FIG. 5 also shows that each of the support legs 150 is provided with reflective sticker 153 outside the support end 152. The reflective sticker 153 reflects light or emits fluorescence in a dark environment to make it easily found.

The sliding element 140 is slidable freely along an axial direction of the guide rod 130. The sliding element 140 may move to the bottom to contact the base body 110. In this case, the sliding element 140 is limited by the base body 110 and will not slide off the guide rod 130. The sliding element 140 is also movable to a top to contact the main body 120. In this case, the sliding element 140 is limited by the main body 120 and will not slide off the guide rod 130. In order to realize the stable connection between the sliding element 140 and the guide rod 130, the sliding element 140 can be sleeved on the outer wall of the guide rod 130. It can be understood that in other embodiments, the sliding element 140 may include a plurality of independent sliding portions. The sliding portions are respectively connected to the support legs 150 and are slidably provided on the guide rod 130.

A side of the base body 110 facing the main body 120 is provided with buffer pad 123 that is configured to contact the sliding element 140. The buffer pad 123 may be an elastic ring such as a silicon rubber ring, a rubber ring, etc. The buffer pad 123 is configured to alleviate the impact of the sliding element 140 on the base body 110 when the sliding element 140 slides toward the base body 110 to avoid damage to either part. Of course, a side of the main body 120 facing the base body 110 can also be provided with a damping pad that is configured to contact the sliding element 140. The damping pad may also be an elastic ring such as a silicon rubber ring or a rubber ring. The damping pad is configured to alleviate the impact of the sliding element 140 on the main body 120 when the sliding element 140 slides toward the main body 120 to avoid damage to either part.

When the sliding element 140 slides along the guide rod 130, the sliding element 140 can drive the support legs 150 to be folded and unfolded. Therefore, the user only needs to move the sliding element 140 to facilitate user operation. In order to realize the above function, the support structure 100b further includes support rods 160. Each of the support rods 160 includes first connecting end 161 and second connecting end 162 that are arranged opposite to each other. The first connecting end 161 is rotatably connected to the support leg 150, and the second connecting end 162 is rotatably connected to the base body 110. Therefore, the support rod 160 is rotatable with the first connecting end 161 as a rotation shaft, and the support rod 160 is also rotatable with the second connecting end 162 as a rotation shaft. The rotating end 151, the first connecting end 161, and the second connecting end 162 form a triangular structure. That is, the support leg 150, the support rod 160, the sliding element 140, and the guide rod 130 form a triangular structure to achieve high stability and strength.

When the sliding element 140 is forced to move toward the base body 110, the distance between the rotating end 151 and the second connecting end 162 is reduced. A downward pressing force of the sliding element 140 and an upward supporting force of the base body 110 generate a resultant force toward the first connecting end 161. The support leg 150 is moved away from the base body 110 under the action of the resultant force. In this way, the support legs 150 are unfolded to increase a radius of a ground support point. The design effectively increases the standing stability of the lighting device 1, such that the lighting device 1 can stand stably when tilted. It should be noted that the sliding element 140 and the guide rod 130 are limited in a peripheral direction, such that the sliding element 140 is limited to rotate in the peripheral direction relative to the guide rod 130 to avoid a risk of bending or breaking the support rod 160 due to accidental rotation of the sliding element 140. FIG. 5 shows that the guide rod 130 has a non-cylindrical outer contour, for example, the guide rod 130 may have a triangular or other outer contours of a different shape.

Similarly, when the sliding element 140 is pulled upward (the sliding element 140 is moved toward the main body 120), the force is changed reversely. The support legs 150 are moved toward the base body 110 under this force, thereby moving the sliding element 140 to fold the support legs 150. In the folded state, the lighting device has a small size and is convenient for carrying.

It should be noted that two ends (first connecting end 161 and second connecting end 162) of the support rod 160 are not necessarily rotatably connected to the support leg 150 and the base body 110, respectively. It can be understood that in other embodiments, the first connecting end 161 is rotatably connected to the support leg 150, and the second connecting end 162 is rotatably connected to the main body 120. In this case, in the folded state, the support rod 160 may not be hidden inside the support leg 150, thus affecting the appearance of the base assembly 100. However, the function will not be affected.

Figure 6:
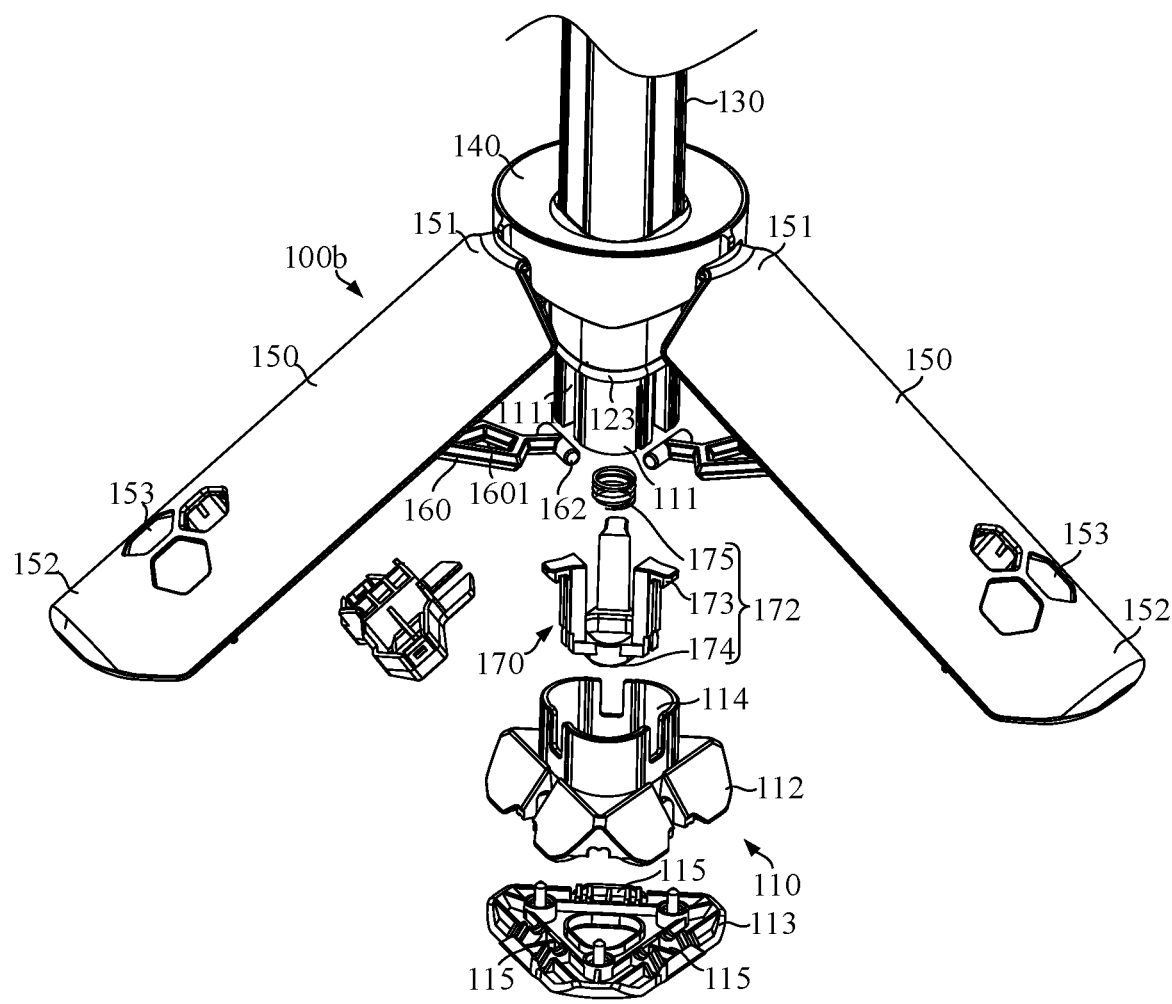
FIG. 6 is an exploded view of a lower half part of the base assembly of the lighting device shown in FIG. 3.

In an embodiment, referring to FIG. 6, the base assembly 100 further includes locking structure 170. The locking structure 170 is configured to lock the support legs 150 to limit the rotation of the support legs 150 when the support legs 150 are in the folded state. In this embodiment, referring to FIGS. 7 and 8, the locking structure 170 includes first locking elements 171 and second locking element 172. One of the first locking element 171 and the second locking element 172 is provided on the base body 110, and the other is provided on the support leg 150. When the base assembly 100 is in the folded state, the first locking elements 171 are engaged with the second locking element 172. The first locking elements 171 and the second locking element 172 can be any structure that can be engaged with each other. For example, the first locking elements 171 and the second locking element 172 may be a groove locking structure, a magnetic suction structure, or a bonding structure.

Figure 7:
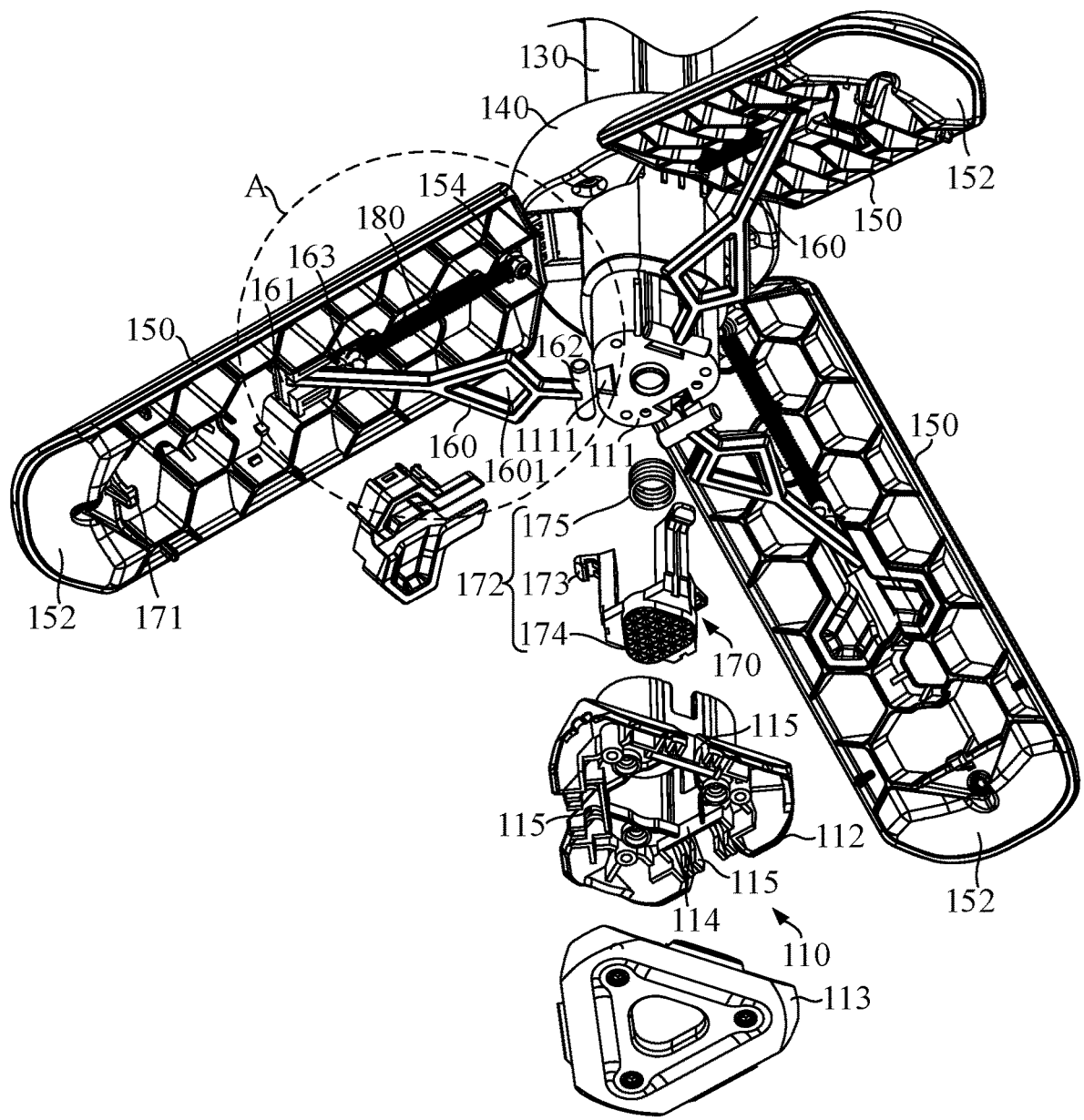
FIG. 7 is a structural diagram of the base assembly shown in FIG. 6 from another perspective.

In an embodiment, FIG. 7 shows that the first locking elements 171 are respectively provided on the support legs 150 and the second locking element 172 is provided on the base body 110. The second locking element 172 includes locking portions 173 and pressing portion 174 that are connected. The locking portions 173 are exposed to a peripheral side of the base body 110, and the pressing portion 174 is exposed to the bottom of the base body 110. When the base assembly 100 is in the folded state, the locking portions 173 are respectively engaged with the first locking elements 171. Thus, the support legs 150 are limited to the base body 110, and the support legs 150 cannot be easily separated from the base body 110. When the support legs 150 need to be unfolded, a force is applied to the pressing portion 174 from the bottom of the base body 110. The pressing portion 174 drives the locking portions 173 to disengage from the first locking elements 171 under the driving action of the external force. Thus, the first locking elements 171 are disengaged from the locking portions 173. The support legs 150 are unlocked, and the support legs 150 can be automatically unfolded under the drive of the sliding element 140. It can be understood that in other embodiments, the second locking element 172 can also be provided on the support leg 150. In this case, the pressing portion 174 can be exposed outside the support leg 150, and the pressing portion 174 can drive the locking portion 173 to be engaged or disengaged from the first locking element 171 through an intermediate transmission mechanism. The intermediate transmission mechanism can be a cam mechanism with a curved surface or a gear set. In the process of driving, the movement direction of the pressing section 174 may be the same as or different from that of the locking portion 173.

Referring to FIG. 7, the second locking element 172 further includes restoring element 175. The restoring element 175 is provided between the base body 110 and the pressing portion 174. When the pressing portion 174 drives the locking portions 173 to disengage from the first locking elements 171, the restoring element 175 accumulates a restoring force. When the external force driving the pressing portion 174 is released, the restoring element 175 releases the restoring force accumulated to restore the locking portions 173. For example, with the restoring force released by the restoring element 175, the locking portions 173 are engaged with the first locking elements 171 again after being restored. It should be noted that FIG. 7 shows that the restoring element 175 is a spring. FIG. 7 shows that the spring is compressed to accumulate a compression-restoring force in a process of force accumulation. However, the mounting position of the spring can also be changed according to user needs, such that the spring is extended to accumulate a tensile restoring force. It can be understood that in other embodiments, the restoring element 175 may also be an elastic pad or an elastic ring. Alternatively, the restoring element 175 may be a magnetic assembly. The magnetic assembly may include a first magnetic element and a second magnetic element. One of the first magnetic element and the second magnetic element is provided on the pressing portion 174, and the other is provided on the base body 110. The first magnetic element and the second magnetic element are arranged opposite to each other and mutually exclusive. When the pressing portion 174 drives the locking portions 173 to disengage from the first locking elements 171, the first magnetic element and the second magnetic element approach each other. The restoring force accumulated by the magnetic assembly is a magnetic repulsive force.

It should be noted that when the plurality of support ends 152 approach each other, the first locking elements 171 contact the locking portions 173. The first locking elements 171 drive the locking portions 173 to move against the restoring force of the restoring element 175, such that the restoring element 175 accumulates a restoring force. The first locking elements are engaged with the locking portions 173 under the action of the restoring force. This can be achieved by setting the mounting positions of the first locking elements 171 and the locking portions 173. In addition, a camber surface, an inclined surface, or a curved surface can be provided at a position where the first locking elements 171 contact the locking portions 173 to realize a guiding effect, such that the first locking elements 171 and the locking portions 173 move along corresponding guiding surfaces. FIG. 7 shows that each of the support rods 160 is provided with avoidance port 1601 through which the first locking elements 171 are engaged with the second locking element 172.

To clearly understand the movement details of the second locking element 172 on the base body 110, please refer to FIG. 7. The base body 110 includes fixed base 111, upper cover 112, and lower cover 113. In the extension direction of the guide rod 130, the fixed base 111, the upper cover 112, and the lower cover 113 are axially connected sequentially. The fixed base 111 is directly connected to the guide rod 130.

The buffer pad 123 is sleeved on the guide rod 130 and attached to one end of the fixed base 111 facing away from the upper cover 112. A side wall of the fixed base 111 is further provided with rail grooves 1111 for guiding the movement of the locking portions 173 respectively. Movable space 114 is formed between the upper cover 112 and the lower cover 113. The pressing portion 174 is movably provided in the movable space 114. The locking portions 173 pass through the movable space 114 and are respectively slidably provided in the rail grooves 1111. The restoring element 175 is provided between the pressing portion 174 and the fixed base 111. A peripheral side of the movable space 114 is further provided with rotating grooves 115 that are matched in number with the support rods 160. The second connecting ends 162 of the support rods 160 are respectively provided on the rotating grooves 115 and are rotatable relative to the base body 110.

In addition, it should be emphasized that the locking structure 170 should only be understood as an embodiment of the present application, and it does not constitute a limitation on the locking structure 170 of the present application. In other embodiments, the locking structure 170 may also be directly connected to the plurality of support legs 150 to realize the mutual limit of any two adjacent support legs 150. For example, the locking structure 170 may be a latch cover. The latch cover can be covered on the bottom of the base body 110 to limit the positions of the plurality of support ends 152 at the same time. Any locking structure 170 that can realize mutual limit of each two adjacent support legs 150 should fall within the protection scope of the present disclosure.

In order to make the support legs 150 automatically unfolded without manual control after being unlocked, in an embodiment, the locking structure 170 is also configured to unlock the support legs 150, such that the sliding element 140 is automatically slidable from a side where the main body 120 is located to a side where the base body 110 is located to unfold the support legs 150.

Figure 8:
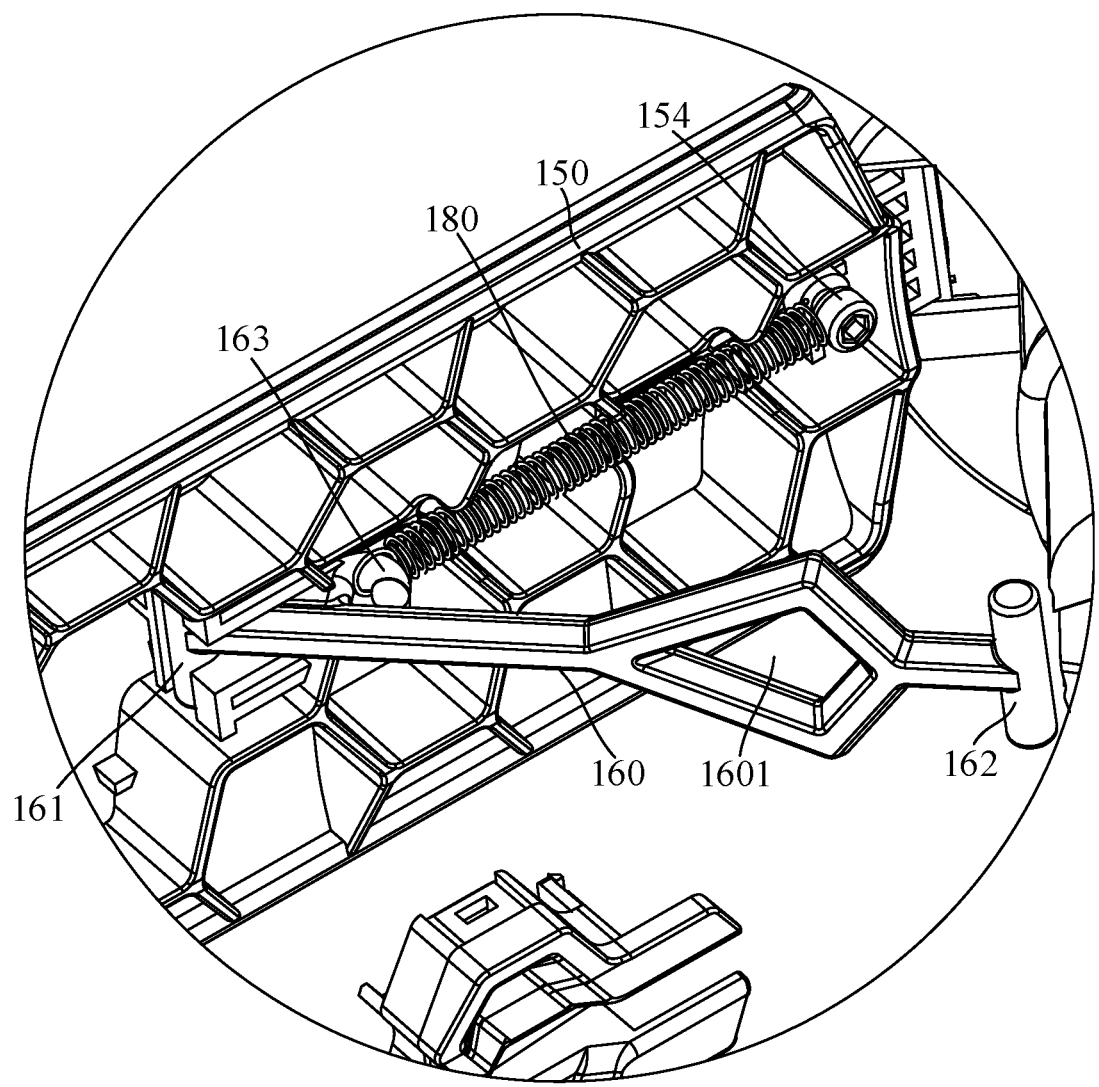
FIG. 8 is an enlarged view of A shown in FIG. 7.

Referring to FIGS. 7 and 8, each of the support rods 160 is provided with first fixing portion 163, and each of the support legs 150 is provided with second fixing portion 154. The base assembly 100 further includes tension spring 180. Two ends of the tension spring 180 are respectively connected to the first fixing portion 163 and the second fixing portion 154. FIG. 8 shows that the first fixing portion 163 is a hook provided on the first connecting end 161 of the support rod 160, and the second fixing portion 154 is a post fixed on the rotating end 151 of the support leg 150. The hook and the post are only illustrative of this embodiment to facilitate understanding of this solution and should not constitute a specific limitation on the embodying form of the first fixing portion 163 and the second fixing portion 154. The tension spring 180 is configured to accumulate an elastic force when the base assembly 100 is in the folded state. The tension spring 180 is also configured to release the elastic force to unfold the support leg 150 when the support leg 150 is unlocked. In the embodiment, the tension spring 180 can be understood to be located between the first connecting end 161 and the rotating end 151. Based on the mounting position of the tension spring 180, in the folded state, the tension spring 180 is in an extended state and accumulates an elastic force.

When the support legs 150 are in the folded state, the distance between the first fixing portion 163 and the second fixing portion 154 increases, and the tension spring 180 is deformed under tension. The tension spring 180 generates a pulling force on the first fixing portion 163 and the second fixing portion 154. At this time, the support legs 150 receive an outward support force, causing the support legs 150 to be unfolded outward. However, the bottom of the support leg 150 is provided with the first locking element 171 or the second locking element 172, and the first locking element 171 is engaged with the second locking element 172, so the support leg 150 cannot be unfolded. Thus, the support leg 150 is kept in the folded state under the action of the locking structure 170.

Since the other end of the second locking element 172 is provided with the pressing portion 174, when the pressing portion 174 is pressed by a force, the pressing portion 174 is displaced. The locking portion 173 loses the locking effect with the first locking element 171. Thus, the support leg 150 is unfolded under the force of the support rod 160, such that the support leg 150 is in the unfolded state.

When the three support legs 150 are in the unfolded state, the three support legs 150 can be manually combined to reset. During resetting, the first locking elements 171 contact the locking portions 173 respectively. Under the action of the locking portions 173, the pressing portion 174 is displaced, such that the support legs 150 are successfully and completely reset to the folded state. The second locking element 172 resets under the action of the elastic element 175 and locks the first locking elements 171.

It should be noted that when the tension spring 180 is located between the first connecting end 161 and the rotating end 151, the second fixing portion 154 can be provided on the support leg 150 or the sliding element 140.

The tension spring 180 may also be located between the first connecting end 161 and the support end 152. When the tension spring 180 is located between the first connecting end 161 and the support end 152, the tension spring 180 is compressed in the folded state to accumulate an elastic force. Since the tension spring 180 has the elastic force to restore an original state, the tension spring can act on the first fixing portion 163 to make the first fixing portion 163 tend to rotate away from the support end 152, that is, tend to drive the support leg 150 to be unfolded. It should be noted that all the above embodiments of the tension spring 180 are also applicable to the case where the support rod 160 is provided between the main body 120 and the support leg 150.

Figure 9:
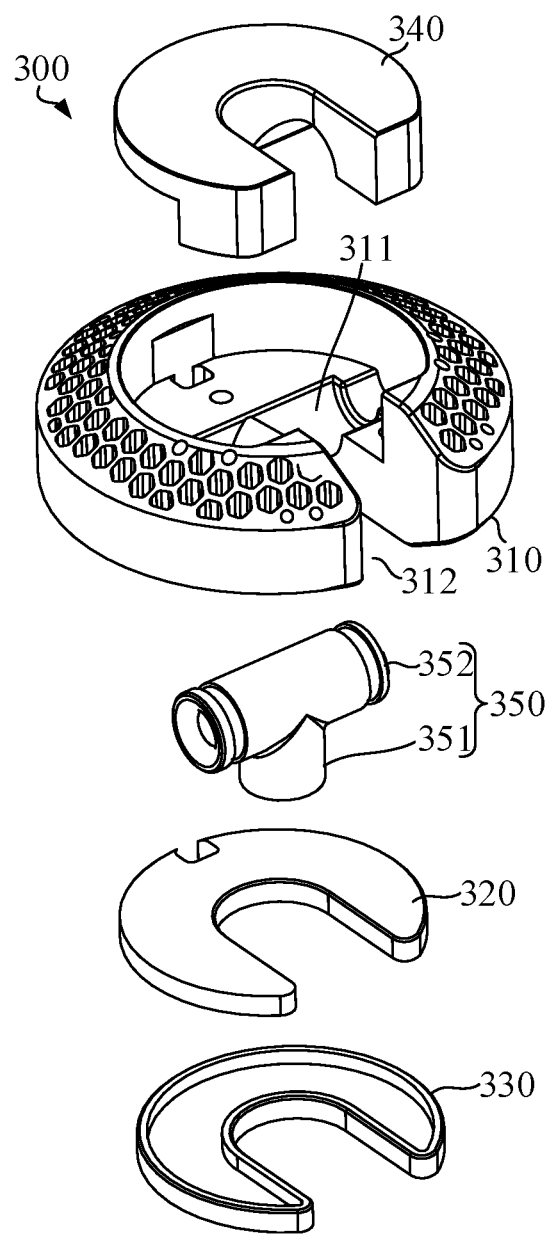
FIG. 9 is an exploded view of the lighting assembly shown in FIG. 3.

In an embodiment, referring to FIG. 9, the lighting assembly 300 includes heat dissipator 310 and lighting element 320. The heat dissipator 310 is connected to the free end 220 of the telescopic rod 200, and the lighting element 320 is provided in the heat dissipator 310. The lighting element 320 is electrically connected to the circuit board 100*d* in the base assembly 100. Specifically, the circuit board 100*d* may be connected to the lighting element 320 through a spring wire. The specific implementation of the spring wire can refer to the detailed introduction of the Chinese patent application CN202221356593.1, which will not be repeated herein. In this embodiment, the lighting element 320 is a light-emitting panel composed of a plurality of parallel and/or series LEDs.

The heat dissipator 310 is provided with rotating groove 311. The lighting element 320 is attached to the heat dissipator 310 to dissipate the heat of the lighting element 320 through the heat dissipator 310. That is, the lighting element 320 is in close contact with the heat dissipator 310 to effectively guide the working heat to the heat dissipator 310, thereby preventing the lighting element 320 from being damaged by high temperature. A side of the heat dissipator 310 away from the rotating groove 311 is provided with mounting groove 312, and the lighting element 320 is provided in the mounting groove 312. The heat dissipator 310 may be made of aluminum alloy. The heat dissipator 310 may also be made of other materials with high heat dissipation performance, which is not limited herein.

To protect the lighting element 320, the lighting assembly 300 further includes transparent protective cover 330. The transparent protective cover 330 is provided on the mounting groove 312 to protect the lighting element 320. Illumination light of the lighting element 320 can directly penetrate the transparent protective cover 330 without being obstructed. The design enables the illumination light to achieve a uniform scattering effect and improves the appearance effect of the lighting assembly 300.

The lighting assembly 300 further includes heat dissipator rear cover 340 covering the rotating groove 311 and configured to transmit the working heat of the lighting element 320 to the heat dissipator 310 and the heat dissipator rear cover 340.

Further, in order to realize the rotation of the lighting assembly 300 relative to the free end 220, the lighting assembly 300 further includes connector 350. The connector 350 is provided with first connecting portion 351 and second connecting portion 352. The first connecting portion 351 is inserted at the free end 220. The connector 350 is rotatable with the first connecting portion 351 as a rotation shaft, thereby realizing axial rotation. The second connecting portion 352 is provided in the rotating groove 311. The lighting assembly 300 is rotatable with the second connecting portion 352 as a rotation shaft, thereby realizing radial rotation.

Specifically, the connector 350 is a T-shaped connector. The first connecting portion 351 of the T-shaped connector is inserted at the free end 220, and the second connecting portion 352 of the T-shaped connector is provided in the rotating groove 311. In this way, the lighting assembly 300 is rotatable axially and radially around the free end 220.

It should be noted that the specific structure of the lighting assembly 300 is based on the detailed introduction of Chinese patent application CN202221356593.1, which will not be repeated herein. In addition, the specific structure of the lighting assembly 300 is only an example of the present application and does not constitute a limitation on the present application.

In the embodiment of the present disclosure, the lighting device 1 is provided with the second locking element 172 located on the base body 110 and the first locking elements 171 located on the support legs 150. When the support legs 150 are in a folded state, the second locking element 172 is engaged with the first locking elements 171, such that the support legs 150 are in a locked state. That is, the second locking element 172 and the first locking elements 171 form a locking fit to prevent the support legs 150 from automatically being unfolded when being stored, thereby preventing the lighting device 1 from being automatically unfolded. The embodiment of the present disclosure solves the problem that the support legs 150 of a traditional lighting device 1 are easily damaged due to looseness in the folded state. In addition, the locking structure 170 of the embodiment of the present disclosure is configured to lock the support legs 150 in a folded state to limit the rotation of the support legs 150. The locking structure 170 can also unlock the support legs 150, such that the sliding element 140 is automatically slidable from the side where the main body 120 is located to the side where the base body 110 is located. Therefore, the support legs 150 can be automatically unfolded without manual operation after being unlocked, thereby facilitating user operation.

The present disclosure is described above with reference to several typical implementations. It should be understood that the terms used herein are intended for illustration, rather than limiting. The present disclosure may be specifically implemented in many forms without departing from the spirit or essence of the present disclosure. Therefore, it should be understood that the above embodiments are not limited to any of the above-mentioned details but should be broadly interpreted according to the spirit and scope defined by the appended claims. Therefore, the appended claims should cover any changes and modifications falling within the claims or the equivalent scope thereof.

What is claimed is:

1. A base assembly, comprising:
    a mounting structure comprising a base body, a main body, and a guide rod provided between the base body and the main body; and
    a support structure comprising a sliding element and a plurality of support legs, wherein the sliding element is slidably connected to the guide rod; each of the plurality of support legs is provided with a rotating end and a support end, wherein the rotating end and the support end are arranged opposite to each other; the rotating end is rotatably connected to the sliding element; and the sliding element is slidable toward the main body to drive a plurality of support ends to approach each other, such that the base assembly is in a folded state; and
    wherein one of the base body and the support leg is provided with a first locking element, and the other of the base body and the support leg is provided with a second locking element; and when the base assembly is in the folded state, the first locking element is engaged with the second locking element;
    wherein the second locking element comprises a locking portion and a pressing portion, wherein the locking portion and the pressing portion are connected to each other; when the base assembly is in the folded state, the locking portion is engaged with the first locking element and the pressing portion is configured to disengage the locking portion from the first locking element; and
    wherein the second locking element is provided on the base body; the locking portion is exposed to a peripheral side of the base body; and the pressing portion is exposed to a bottom of the base body.

2. The base assembly according to claim 1, wherein the support structure further comprises support rods; each of the support rods comprises a first connecting end and a second connecting end, wherein the first connecting end and the second connecting end are arranged opposite to each other; the first connecting end is rotatably connected to the support leg, and the second connecting end is rotatably connected to the base body; and alternatively, the first connecting end is rotatably connected to the support leg, and the second connecting end is rotatably connected to the main body.

3. The base assembly according to claim 1, wherein the second locking element further comprises a restoring element provided between the base body and the pressing portion; and the restoring element is configured to accumulate a restoring force, and the restoring element is further configured to release the restoring force to engage the locking portion with the first locking element.

4. The base assembly according to claim 3, wherein when the plurality of support ends approach each other, the first locking element is configured to drive the locking portion to move against the restoring force of the restoring element, such that the restoring element accumulates the restoring force, and the first locking element is engaged with the locking portion under an action of the restoring force.

5. The base assembly according to claim 1, wherein the first locking element and the second locking element are configured to disengage from each other; and when the first locking element and the second locking element disengage from each other, the sliding element is automatically slidable from a first side to a second side to unfold the plurality of support legs, wherein the main body is located on the first side, and the base body is located on the second side.

6. The base assembly according to claim 5, wherein the support structure further comprises support rods; each of the support rods comprises a first connecting end and a second connecting end, wherein the first connecting end and the second connecting end are arranged opposite to each other; the first connecting end is rotatably connected to the support leg, and the second connecting end is rotatably connected to the base body; each of the support rods is provided with a first fixing portion, and each of the plurality of support legs or the sliding element is provided with a second fixing portion; the base assembly further comprises a tension spring; two ends of the tension spring are respectively connected to the first fixing portion and the second fixing portion; and the tension spring is configured to accumulate and release an elastic force with rotation of the support leg.

7. The base assembly according to claim 1, wherein when the base assembly is in the folded state, an outer surface of each of the plurality of support legs is flush with an outer surface of the main body; and/or
    the base assembly further comprises a battery and a circuit board, wherein the battery and the circuit board are provided on the main body and electrically connected to each other; and/or
    a side of the base body is provided with a buffer pad, wherein the side of the base body faces the main body, and the buffer pad is configured to contact the sliding element; and/or
    a side of the main body is provided with a damping pad, wherein the side of the main body faces the base body, and the damping pad is configured to contact the sliding element; and/or
    the sliding element and the guide rod are limited in a peripheral direction to limit rotation of the sliding element; and/or
    each of the plurality of support legs is provided with a reflective sticker outside the support end; and/or
    each of the plurality of support legs is provided with a magnetic element at the support end; and/or
    the sliding element is sleeved outside the guide rod; and/or
    each of the main body and the guide rod is a hollow structure with two ends open; and the main body is communicated with the guide rod.

8. A lighting device, comprising:
    the base assembly according to claim 1, wherein the mounting structure is provided with a circuit board;
    a telescopic rod provided with a fixed end and a free end, wherein the fixed end and the free end are arranged opposite to each other, the fixed end is connected to the mounting structure, and the free end is configured to extend and retract relative to the fixed end along a length extension direction of the telescopic rod; and
    a lighting assembly provided with a lighting element, wherein the lighting element is electrically connected to the circuit board; and the lighting assembly is rotatably connected to the free end to switch a lighting direction of the lighting element.

9. A base assembly, comprising:
a mounting structure comprising a base body, a main body, and a guide rod provided between the base body and the main body;
a support structure comprising a sliding element and a plurality of support legs, wherein the sliding element is slidably connected to the guide rod; each of the plurality of support legs is provided with a rotating end and a support end, wherein the rotating end and the support end are arranged opposite to each other; the rotating end is rotatably connected to the sliding element; and the sliding element is slidable toward the main body to drive a plurality of support ends to approach each other, such that the base assembly is in a folded state; and
a locking structure configured to lock the plurality of support legs in the folded state to limit rotation of the plurality of support legs, wherein the locking structure is further configured to unlock the plurality of support legs such that the sliding element is automatically slidable from a first side to a second side to unfold the plurality of support legs, wherein the main body is located on the first side, and the base body is located on the second side;
wherein the support structure further comprises support rods; each of the support rods comprises a first connecting end and a second connecting end, wherein the first connecting end and the second connecting end are arranged opposite to each other; the first connecting end is rotatably connected to the support leg, and the second connecting end is rotatably connected to the base body; each of the support rods is provided with a first fixing portion, and each of the plurality of support legs or the sliding element is provided with a second fixing portion; the base assembly further comprises a tension spring; two ends of the tension spring are respectively connected to the first fixing portion and the second fixing portion; and the tension spring is configured to accumulate an elastic force when the base assembly is in the folded state, and the tension spring is further configured to release the elastic force to unfold the support leg when the support leg is unlocked;
wherein the locking structure comprises a first locking element and a second locking element one of the base body and the support leg is provided with the first locking element, and the other of the base body and the support leg is provided with the second locking element and when the base assembly is in the folded state, the first locking element is engaged with the second locking element; and
each of the support rods is provided with an avoidance port, wherein the first locking element is engaged with the second locking element through the avoidance port.

10. The base assembly according to claim 9, wherein the tension spring is located between the first connecting end and the rotating end; and in the folded state, the tension spring is extended to accumulate the elastic force.

11. The base assembly according to claim 9, wherein the tension spring is located between the first connecting end and the support end; and in the folded state, the tension spring is compressed to accumulate the elastic force.

12. The base assembly according to claim 9, wherein the first fixing portion is a hook, and the second fixing portion is a post; and the tension spring is hung to the hook and sleeved outside the post.

13. The base assembly according to claim 9, wherein the second locking element is provided on the base body, and the second locking element comprises a locking portion, a pressing portion, and a restoring element; the locking portion is exposed to a peripheral side of the base body; the pressing portion is exposed to a bottom of the base body; the restoring element is provided between the base body and the pressing portion; when the base assembly is in the folded state, the locking portion is engaged with the first locking element; the pressing portion is configured to disengage the locking portion from the first locking element; and the restoring element is configured to accumulate a restoring force, and the restoring element is further configured to release the restoring force to engage the locking portion with the first locking element.

14. The base assembly according to claim 9, wherein the support structure further comprises support rods; each of the support rods comprises a first connecting end and a second connecting end, wherein the first connecting end and the second connecting end are arranged opposite to each other; the first connecting end is rotatably connected to the support leg, and the second connecting end is rotatably connected to the main body; each of the support rods is provided with a first fixing portion, and each of the plurality of support legs or the sliding element is provided with a second fixing portion; the base assembly further comprises a tension spring; two ends of the tension spring are respectively connected to the first fixing portion and the second fixing portion; and the tension spring is configured to accumulate an elastic force when the base assembly is in the folded state, and the tension spring is further configured to release the elastic force to unfold the support leg when the support leg is unlocked.

15. The base assembly according to claim 9, wherein when the base assembly is in the folded state, an outer surface of each of the plurality of support legs is flush with an outer surface of the main body; and/or
the base assembly further comprises a battery and a circuit board, wherein the battery and the circuit board are provided on the main body and electrically connected to each other; and/or
a side of the base body is provided with a buffer pad, wherein the side of the base body faces the main body, and the buffer pad is configured to contact the sliding element; and/or
a side of the main body is provided with a damping pad, wherein the side of the main body faces the base body, and the damping pad is configured to contact the sliding element; and/or
the sliding element and the guide rod are limited in a peripheral direction to limit rotation of the sliding element; and/or
each of the plurality of support legs is provided with a reflective sticker outside the support end; and/or
each of the plurality of support legs is provided with a magnetic element at the support end; and/or
the sliding element is sleeved outside the guide rod; and/or
each of the main body and the guide rod is a hollow structure with two ends open; and the main body is communicated with the guide rod.

16. A lighting device, comprising:
the base assembly according to claim 9, wherein the mounting structure is provided with a circuit board;
a telescopic rod provided with a fixed end and a free end, wherein the fixed end and the free end are arranged opposite to each other, the fixed end is connected to the mounting structure, and the free end is configured to extend and retract relative to the fixed end along a length extension direction of the telescopic rod; and a lighting assembly provided with a lighting element, wherein the lighting element is electrically connected to the circuit board; and the lighting assembly is rotatably connected to the free end to switch a lighting direction of the lighting element.

\* \* \* \* \*